United States Patent Office 3,518,871
Patented July 7, 1970

3,518,871
PRESSURE GAUGE CONTAINING CALIBRATION
MEANS
Ryosaku Kaneda, Tokyo, Shojiro Yamamoto,
Tokorozawa-shi, Saitama-ken, and Kesakatsu
Koizumi, Tokyo, Japan, assignors to Agency of
Industrial Science & Technology, Tokyo, Japan,
a corporation of Japan
Filed Mar. 5, 1969, Ser. No. 804,524
Claims priority, application Japan, Mar. 8, 1968,
43/14,654
Int. Cl. G01l 27/00
U.S. Cl. 73—4                                    2 Claims

ABSTRACT OF THE DISCLOSURE

The calibration of a pressure gauge is accomplished by connecting a retractile container, in which a phase transition substance such as ammonium fluoride is hermetically sealed, to the same pressure as the pressure gauge. The detection of the discontinuous change in volume due to the phase transition of the substance when the pressure to be measured reaches the phase transition pressure and ascertaining simultaneously whether the pointer of the pressure gauge indicates the phase transition pressure will indicate the need for correcting the pressure gauge.

BACKGROUND OF THE INVENTION

This invention relates to a high pressure gauge provided inside with a calibration means. With the advance of the high-pressure scientific industry, secondary pressure gauges which can be used for measuring high pressures of more than several thousands bars have been developed and are presently used, but, because they are used under severe conditions of high pressure, their indications are liable to become inaccurate. Heretofore, the accuracy of the indication of a pressure gauge has been frequently tested by a standard primary pressure gauge such as the dead-weight type, but such test is inconvenient, and, therefore, it has been strongly desired to develop a high pressure gauge which is reliable in continuous use.

The object of this invention is to provide a pressure gauge in which the indication can easily be calibrated during the measurement of pressure. That is, this invention relates to a pressure gauge provided, at an interior portion where pressure to be measured is applied, with a retractile container in which a phase transition substance is hermetically sealed so that high pressure may be measured accurately by means of detecting the discontinuous change in volume due to the phase transition of said substance when the pressure to be measured reaches the phase transition pressure of said substance and of ascertaining simultaneously whether the pointer of the pressure gauge indicates said phase transition pressure.

The phase transition pressure of a certain substance is always constant, and, the pressure gauge of this invention, since it is provided with a calibration means utilizing such a physical constant as phase transition pressure, can be used to measure the pressure while checking the accuracy in indication by the pointer of the gauge. In particular, the pressure gauge of this invention makes it possible to measure high pressures easily and in high accuracy.

The phase transition substance used in the present invention must fulfill the following three requirements:

(a) the substance must rapidly change its phase under a specific pressure within the scale range of the pressure gauge, (b) the substance must change in volume largely and discontinuously at the time of the phase transition, and, (c) the substance must be low in dependency of the phase transition pressure upon temperature.

The above requirement (a) is essential because it forms the basis on which the indication of the pressure gauge is calibrated, and it is desirable that the substance change in phase within the pressure range of ½ to ⅔ of the maximum scale of the gauge. It is also necessary that the substance changes in phase rapidly because, if the phase transition proceeds slowly, then, before the substance reaches its phase equilibrium state, a longer period of time is required, making it difficult to measure the pressure accurately.

As for the requirement (b) above, it is preferable that the substance change in volume largely because, in the pressure gauge of this invention, the phase transition is detected by the discontinuous change in volume. Also, when the change in volume is great, only a small amount of phase transition substance is required for a given pressure gauge.

As for the requirement (c) above, it is necessary in practice to select a substance of which phase transition pressure will not change according to temperature; otherwise, it is difficult and also troublesome to control the temperature in the measurement of pressure.

As a result of research, the present inventors found that ammonium fluoride (hereinafter referred to as $NH_4F$) is suitable for use as a substance which satisfies the above requirements. It is known that $NH_4F$ changes its phase from wurtzite structure (hereinafter referred to as $NH_4F$–I) to rock salt (NaCl) structure (hereinafter referred to as $NH_4F$–II) with about 28% reduction in volume at room temperature under a pressure of 3605 bar, and further changes its phase from $NH_4F$–II to cesium chloride (CsCl) structure (hereinafter referred to as $NH_4F$–III) with about 11% reduction in volume under a pressure of 11500 bar. Also, $NH_4F$ possesses superior characteristics such that its phase transition from $NH_4F$–I to $NH_4F$–II proceeds rapidly and that the dependency of the transition pressure thereof upon temperature is as small as about 2.5 bar/degree which is practically negligible. Accordingly, high pressure can be measured accurately by a pressure gauge of from 4000 bar to 15000 bar in maximum scale provided inside with a calibration means using said $NH_4F$ as a phase transition substance.

DETAILED EXPLANATION OF THE INVENTION

Figure 1:
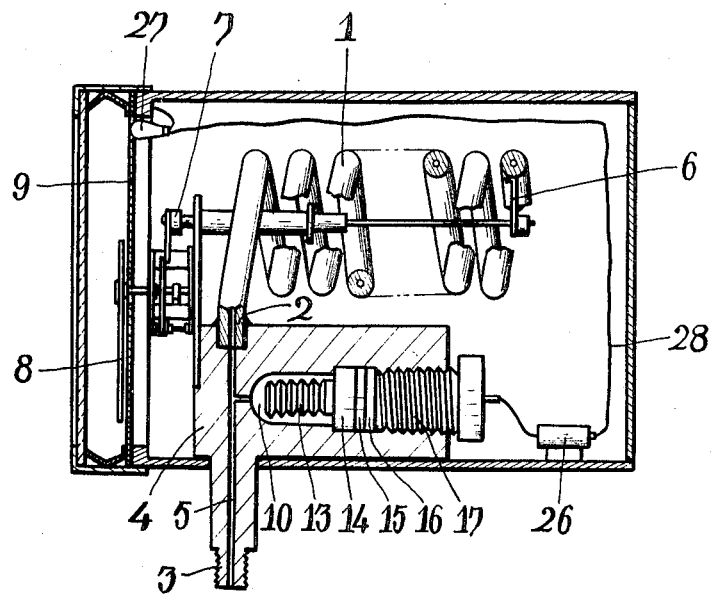
FIG. 1 is a sectional view of a Bourdon tube pressure gauge provided inside with a calibration means according to the present invention.
Figure 2:
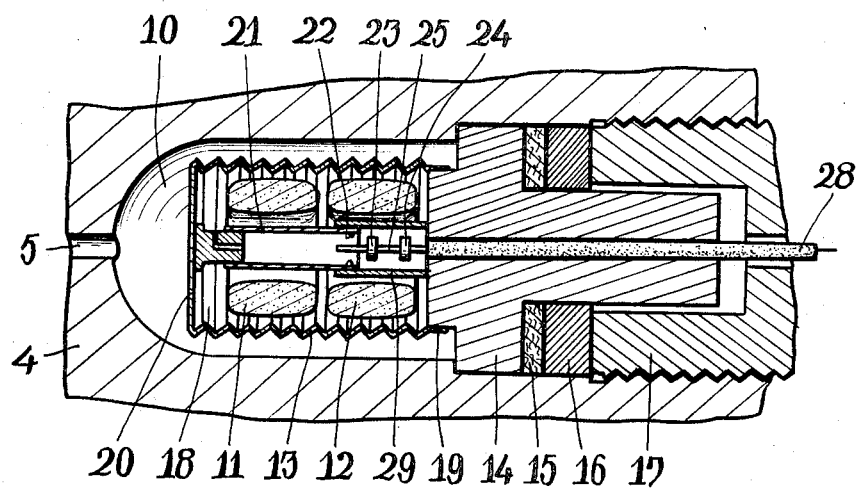
FIG. 2 is an enlarged sectional view of the calibration means illustrated in FIG. 1.

Referring to the drawing, one end 2 of a helical Bourdon tube 1 is fixed to a pressure conducting portion 4 having a setscrew portion 3 of the pressure gauge. The pressure to be measured is conducted through a pressure conducting hole 5 into the Bourdon tube 1 then transmitted to a pointer 8 on a scale plate 9 through a transmission means 7 which transmits the movement of a free end 6 of the Bourdon tube caused by said pressure, and detected by the indication of said pointer. A chamber 10 in which a phase transition substance is to be sealed is set in said pressure conducting portion 4 and communicated with the pressure conducting hole 5.

$NH_4F$ 12 as a phase transition substance is hermetically sealed in soft bags made of a tough anti-corrosive film such as polyethylene film, said bags being inserted together with a non-freezing pressure transmitting liquid 18 having high electric insulating properties such as gasoline in a metal bellows 13 which, being retractile in the axial direction, has one end 19 soldered to a closed plug 14 and which is hermetically sealed in the chamber 10 by a packing 15, a packing push metal 16 and a retaining nut 17 so as to prevent leakage of the pressure from said chamber.

The $NH_4F$ is packed in several bags in small portions so as to make the contact area of each bag with the pressure transmitting liquid large and thereby to allow the $NH_4F$ to uniformly and correctly receive the pressure to be measured through the bags 11, the pressure transmitting liquid 18 and the bellows 13. A hollow metal tube is projected inwardly from the center of the free end 20 of the bellows 13 to form a support 21 for contact element 22 which is mounted at the end of the inner surface of said support. An electrode 25 having two contact points 23 and 24 is fixed, in opposite to said contact element, to the end surface of the closed plug 14 through an insulator so that the contact element 22 is brought into contact with point 23 or 24 and moved with the expansion and contraction of the bellows 13. The support 21 is loosely inserted in a guide cylinder 29 fixed to the end surface of the closed plug 14, so as to move correctly and smoothly in its axial direction with the expansion and contraction of the bellows 13.

The contact points 23 and 24 are provided for indicating the transition of the phase from $NH_4F$-I to $NH_4F$-II and from $NH_4F$-II to $NH_4F$-III, respectively, and their contact lengths and fixed positions are set so as to correspond to the displacement of the bellows to be caused by the discontinuous change in volume due to the phase transition of $NH_4F$. When the contact point 23 or 24 is brought into contact with the contact element 22, an electric circuit comprising a battery 26, and an indicating lamp 27 and a lead wire 28 is completed and the indicating lamp on the scale plate is lit, indicating that the $NH_4F$ in the bellows 13 is in a state of phase transition.

Figure 3:
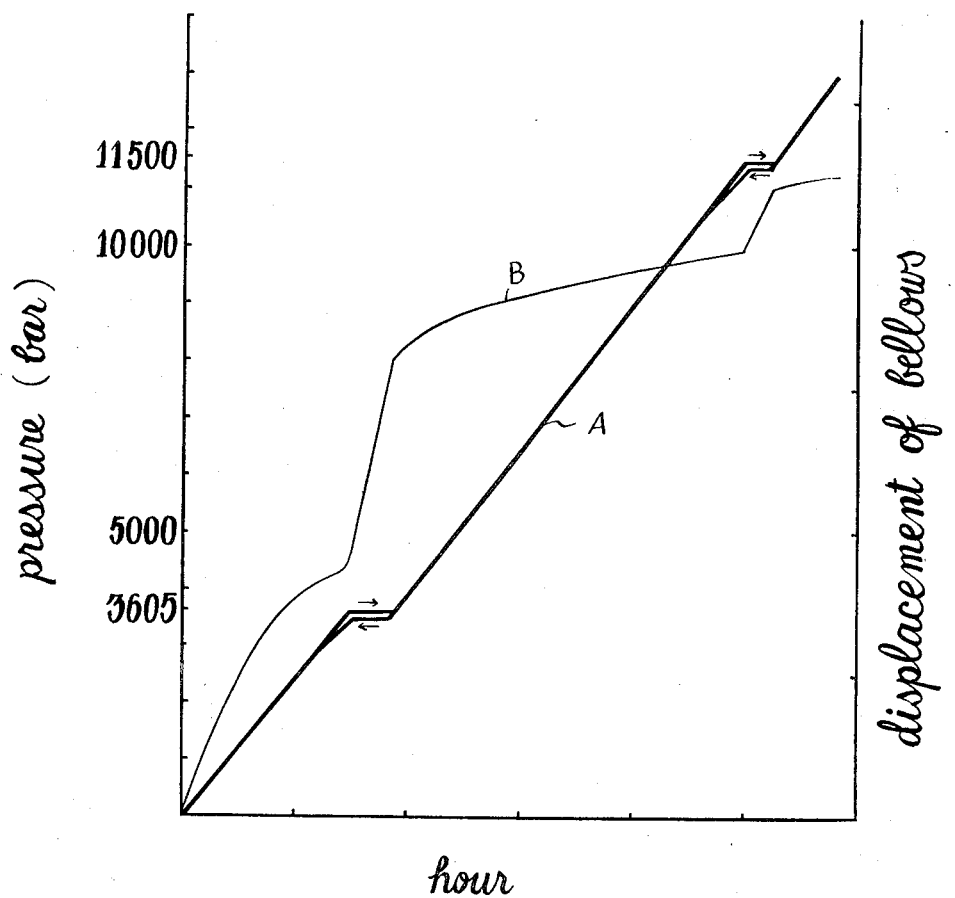
FIG. 3 is a graph showing the characteristics in operation of the above pressure gauge.

In FIG. 3, the pressure gauge provided inside with the above $NH_4F$-containing bellows is connected with a pressure pump. When pressure is applied and raised at a constant rate, the pointer shows curve A as graphed in FIG. 3. Initially, the indication by the pointer of the pressure gauge rises almost in proportion to the pressure applying time. When the pressure reaches 3605 bar and $NH_4F$-I begins to transit to $NH_4F$-II (this transition will actually be initiate at the pressure slightly higher than the above value), the $NH_4F$-containing bellows is discontinuously contracted by the discontinuous decrease in volume of $NH_4F$ due to the phase transition. During the phase transition, the bellows continues to displace discontinuously, whereas the indication by the pointer of the pressure gauge is kept at a constant value, and the contact element 22 is brought into contact with the contact point 23 to light the indicating lamp 27. Upon completion of the transition of all amounts of $NH_4F$, the lamp is off and indication by the pointer begins to rise.

When the pressure is increased to 11500 bar, the phase transits from $NH_4F$-II to $NH_4F$-III and the indication by the pointer of the pressure gauge is kept at a constant value. In this state, the displacement of the bellows proceeds discontinuously and the lamp is lit.

Upon completion of the phase transition of the whole $NH_4F$, the lamp is off and the indication by the pointer begins to rise again.

Curve B in FIG. 3 illustrates the displacement of the bellows in which $NH_4F$ is sealed. The bellows continuously changes in volume before the phase transition from $NH_4F$-I to $NH_4F$-II begins to occur, but, once the phase transition occurs, said volume is rapidly varied. Upon completion of all the phase transition of $NH_4F$, the bellows again begins and continues to change in its volume and, at the time of the phase transition to $NH_4F$-III, said volume is rapidly varied.

In case the pressure is decreased at an almost constant rate, approximately the same curve is inversely traced with some hysteresis phenomenon.

Incidentally, when the pressure variation is suddenly applied to the pressure gauge during the phase transition, the indication by the pointer is instantly varied, but is restored to the original value in a little while.

The reason why such an effect of indication as above is obtained in the phase transition is that a large, rapid and discontinuous change in volume due to the phase transition of $NH_4F$ automatically compensates for the pressure variation in the measurement system; in other words, $NH_4F$ in which two phases co-exist acts as a constant pressure element.

The time during which the indication is maintained at a constant value depends upon the rate of increase or decrease in the amount of pressure, the amount of $NH_4F$ sealed in, and the content volume of the measurement system. Accordingly, the fact that the indication by the pointer temporarily exhibits a constant value at a specific point during the time the pressure increases or decreases shows clearly the state that, in $NH_4F$, two phases co-exist. This state can also be confirmed by lighting of a phase transition indicating lamp 27 in FIG. 1, so the indication by the pointer of the pressure gauge can easily be calibrated at any time during its use at a work place by checking up whether the indication correctly points the $NH_4F$ phase transition pressure (3605 bar in the transition from $NH_4F$-I to II and 11500 bar in the transition from $NH_4F$-II to III).

The present invention has been described for a specific embodiment, that is, the self-calibration type of Bourdon tube pressure gauge as an example, but it is to be understood that the calibration means utilized in the present invention can also be applied, in addition to the above Bourdon tube pressure gauge, to any type of secondary gauges such as an elastic manometer, a manganin resistance presure gauge and the like.

It is also possible to employ, in place of the indication lamp, an electric phase transition indicating mechanism which detects the discontinuous displacement of the bellows by a differential transformer, or a mechanical phase transition indicating mechanism which can be used to detect said displacement mechanically at the outside of the system. It is generally necessary and also convenient that such a type of indicating mechanism be mounted in the gauge, but, as set forth above, the phase transition can also be detected by merely observing the effect of indication of the pointer resulting from the discontinuous variation in volume due to the phase transition. In particular, when a recording type of pressure gauge is employed, said variation can be detected relatively easily from an indication curve on a recording paper, so the construction of the gauge can be simplified by directly mounting therein a phase transition substance sealed merely in a soft container.

Also, the calibration means utilized in the present invention may be composed not only of one type of phase transition substance but also of two or more types of substances which differ mutually in phase transition pressure.

What is claimed is:

1. A pressure gauge provided, at an interior portion where pressure to be measured is applied, with a calibration means composed of a retractile container connected to said pressure and in which a phase transition substance is hermetically sealed, said means detecting the discontinuous change in volume due to the phase transition of said substance when the pressure to be measured reaches the phase transition pressure of said substance, whereby to ascertain whether the operation of said pressure gauge is conducted properly.

2. A pressure gauge according to claim 1, wherein said phase transition substance is ammonium fluoride.

References Cited

UNITED STATES PATENTS

| | | | |
|---|---|---|---|
| 2,693,113 | 11/1954 | Hejduk | 73—4 XR |
| 3,250,872 | 5/1966 | Hellman | 73—4 XR |
| 3,312,101 | 4/1967 | Melfi et al. | 73—4 XR |
| 3,434,330 | 3/1969 | Ingham et al. | 73—4 XR |

LOUIS R. PRINCE, Primary Examiner

H. C. POST III, Assistant Examiner

U.S. Cl. X.R.

200—81